April 14, 1970   S. RIGG   3,506,539

NUCLEAR REACTORS

Filed July 27, 1967   2 Sheets-Sheet 1

United States Patent Office 3,506,539
Patented Apr. 14, 1970

3,506,539
NUCLEAR REACTORS
Shepherd Rigg, Warrington, England, assignor to United Kingdom Atomic Energy Authority, London, England
Filed July 27, 1967, Ser. No. 656,560
Claims priority, application Great Britain, Aug. 8, 1966, 35,472/66; Jan. 27, 1967, 4,140/67
Int. Cl. G21c 15/18, 15/00, 19/28
U.S. Cl. 176—51         6 Claims

ABSTRACT OF THE DISCLOSURE

A nuclear reactor has a pressuriser in which there is disposed a heat exchanger coil for decay heat removal. If normal coolant circulation fails, an auxiliary coolant is caused to flow through the coil by inducting say a convection flow by means of a normally baffled radiator disposed in a chimney. This auxiliary coolant condenses steam in the pressuriser and the condensate is returned to the reactor core for coolant purposes. In one embodiment the condensate is collected in a drip-tray-like funnel which is normally valved off. In another embodiment a convection path is established from the pressuriser to the pressure vessel by electrically held valves which open up the path when the electricity is cut off.

---

This invention relates to nuclear reactors.

In the case of the so-called pressurised water reactor (P.W.R.) in which a reactor core is cooled by pumped circulation of pressurised water, it is customary to provide a pressuriser to act as a restraint against boiling of water within the reactor core, since such boiling can have an adverse effect on the operational characteristics of the reactor due to both the effects on core and pump performance. A typical pressuriser has a pressuriser vessel housing electrical heaters immersed in water and also housing cooling spray nozzles in a steam space above the water in which the heaters are immersed. By means of the heaters an over-pressure can be generated in the steam space which is applied to the water in the pressuriser and thence to the main body of coolant water circulating through the core to restrain boiling. The cooling spray nozzles can be used to spray cool water into the steam space to reduce the pressure therein to follow transients in the reactor system.

According to the present invention, in a nuclear reactor having a core to be cooled by pumped circulation of a pressurised liquid coolant, and having an associated pressuriser, the pressuriser has integral with it a heat exchanger adapted to provide for limited circulation of the coolant through the core in the absence of the pumped circulation.

In one embodiment of the invention, the integral heat exchanger in the event of failure of the pumped circulation receives a flow of a coolant and condenses steam within the pressuriser, the condensate falling into a collector for return into the reactor pressure vessel by a special conduit. In another embodiment the condensate falls into the water in the pressuriser and thence through the conduit provided to transmit the pressure from the pressuriser to the reactor in normal operation. The spray nozzle can be omitted and replaced by a valved duct which allows a greater or lesser flow of coolant through the pressuriser which thus counteracts the operation of the heaters to a greater or lesser extent. This valved duct or one in parallel with it can be fully opened in the event of failure of the pumped circulation to free a natural convection path through the pressuriser.

Figure 1:
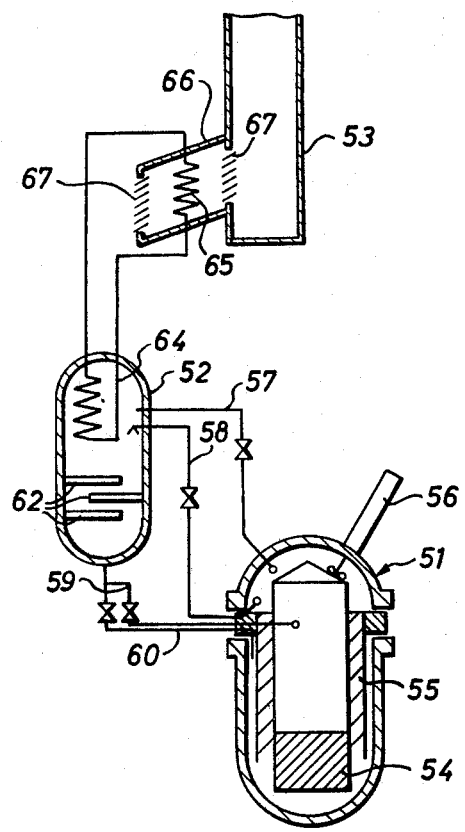
Figure 2:
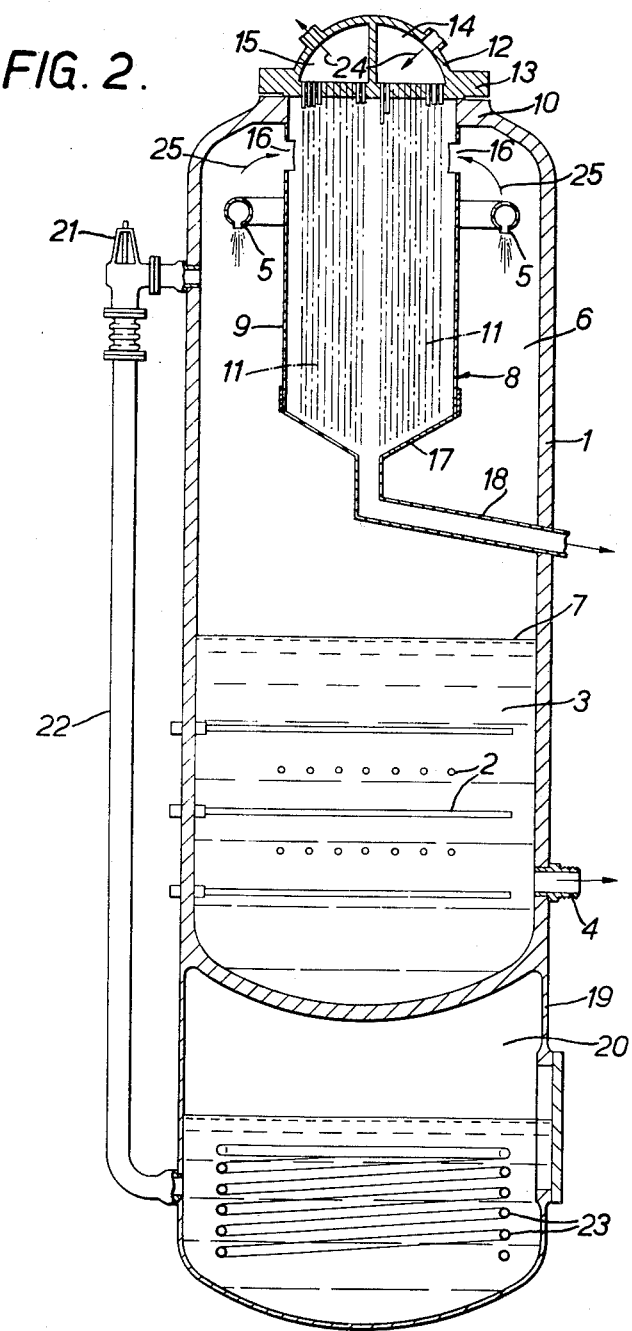

A nuclear reactor in accordance with the invention will now be described by way of example with reference to the drawings in which:

FIG. 1 is a schematic representation of a nuclear reactor illustrating the pumped coolant circulation circuit and the auxiliary coolant circuit and FIG. 2 is a sectional elevation of a pressuriser showing an alternative construction to FIG. 1.

In FIG. 1 there is shown a nuclear reactor pressure vessel 51, a pressuriser 52 somewhat higher than the pressure vessel, and a heat disposal chimney 53. The pressure vessel 51 contains a core 54, and a heat exchanger 55. Coolant is drawn through the core 54 and pumped through the heat exchanger 55 by a circulator 56.

Two valved ducts 57 and 58 communicate between a high pressure region in the pressure vessel, that is at the circulator outlet, and an upper part of the pressuriser 52. Two other valved ducts 59 and 60 communicate between the lower part of the pressuriser and low pressure regions in the pressure vessel, duct 59 to the circulator inlet and duct 60 to a point upstream of the core 54 and downstream of the heat exchanger 55. The pressuriser contains electrical heaters 62 below the water level therein.

Within the upper part of the pressuriser there is a heat exchanger coil 64 which is connected to a radiator 65 disposed at the foot of the chimney 53 in thermally insulating container 66 sealed off by electrically held louvres 67.

In normal operation duct 59 transmits the pressure generated in the pressuriser to the pressure vessel and ducts 58 and 60 are closed. An electrical regulator controls the degree of opening of duct 57 and the heaters in the pressuriser. These conditions are electrically held. On failure of the pumped circulation within the pressure vessel as by failure of the electrical supply, the louvres are released to fall open so that auxiliary coolant circulates in the coil 64 by convection, ducts 58 and 60 are freed, ducts 57 and 59 closed and the pressuriser heaters rendered inoperative. Steam is condensed on the coil 64 and the condensate falls into the water in the pressuriser and establishes a natural convection circulation through duct 60, the core 54 and duct 58. At this time the pressure in the system is falling so that steam flashes off and the flow through duct 58 is in the steam phase aiding the natural convection circulation.

FIG. 2 shows an alternative form of pressuriser comprising a pressuriser vessel 1 housing electrical heaters 2 immersed in water 3, the vessel 1 having at its lower end in the region of the heaters 2 a pipe 4 communicating with the primary coolant circuit of a nuclear reactor (P.W.R.) having a core of fuel elements housed in a reactor pressure vessel, the core being normally cooled during reactor operation by pumped circulation of the primary circuit coolant water. The pressuriser vessel 1 houses adjacent its upper end cooling spray nozzles 5 in a steam space 6 above level 7 of the water in which the heaters 2 are immersed.

In accordance with the invention the pressuriser has an integral heat exchanger 8, comprising a hollow cylinder 9 coaxial with the vessel 1 and mounted from a circular flange 10 thereon. The cylinder 9 houses U-tubes 11 mounted from a ported domed head 12 having a flange 13 sealed to the flange 10. The U-tubes 11 communicate at one end with an inlet manifold 14 in the head 12 and at their other ends with an outlet manifold 15 in the head 12. Near its upper end the cylinder 9 has ports 16, and at its lower end is connected to a drip tray or collector in the form of a hollow cone 17 having a valved pipe 18 penetrating the vessel 1 and communicating with the primary coolant circuit on the coolant inlet side of the core.

The inlet and outlet manifolds 14 and 15 can be connected to a radiator which is normally muffled against heat loss but in an emergency can be unmuffled. For example the radiator could be disposed in a chimney-type stack with electrically held doors at the base sealing the base except when heat rejection is required. Preferably the outlet manifold 15 is connected into a steam separating drum, the steam outlet of which leads into the radiator and the water outlet of which returns the water from the drum to the inlet manifold 14 where it rejoins any condensate formed by steam condensing in the radiator. By incorporating a steam space in this circuit, problems of thermal expansion are reduced and the use of steam instead of hot water in the radiator permits economics in the design of the radiator.

At its lower end the pressuriser is extended by an integral coaxial extension 19 of the vessel 2 to form a separate closed condenser volume 20. A relief valve 21 communicating with the steam space 6 also communicates with the volume 20 by way of a connecting pipe 22, and the extension 19 houses a cooling coil 23.

During normal reactor operation, cooling of the core is by pumped circulation of primary coolant water through the core, and the heaters 2 and nozzles 5 are used to generate and control an over-pressure in the steam space 6 which is applied to the water 3 and thence to the primary coolant-water circulating through the core (to restrain boiling of water within the core) by way of the pipe 4 which communicates with the primary coolant circuit on the coolant outlet side of the core. The valved pipe 18 is closed during such normal operation.

In the event of the absence of pumped circulation of coolant water through the core e.g. by failure of the circulating pump or pumps, the reactor is shut-down and the pipe 18 is opened and auxiliary coolant is caused as by convection due to cooling of the radiator herein before mentioned, for example by opening the doors at the foot of the stack, to flow through the U-tubes 11 as indicated by arrows 24. Decay heat from the core transmitted through the water in the pipe 4 and the water 3 generates steam in the space 6 which flows through the ports 16 (as indicated by arrows 25) to be condensed whilst flowing to the primary coolant circuit by way of the pipe 18. In this manner a limited circulation of water through the core is established in the absence of pumped circulation, this limited circulation being sufficient to remove decay heat from the core under reactor shut-down conditions.

The arrangement of the pressuriser with its integral decay heat removal heat exchanger gives a compact and economic reactor system. With a reactor with two diametrically opposed circulating pumps, two external pressurisers such as that described above may be disposed at opposite ends of a diameter at right-angles to that of the pumps thus giving a symmetrical arrangement leading to a reduction in containment vessel size.

Pressure surges in the steam space 6 may be released to the condenser volume 20, and this integrated arrangement of pressuriser, decay heat removal exchanger and condenser has the advantage that it gives a markedly compact reactor system. Pipes from relief valves associated with other components of the reactor system may also be connected to the condenser volume defined below the pressuriser.

I claim:

1. A nuclear reactor having a core to be cooled by pumped circulation of a pressurized liquid coolant and having an associated pressurizer mounted at a higher level than the core wherein the improvement comprises a heat exchanger integral with the pressurizer and incorporated in a fluid containing circuit, said fluid containing circuit further including heat rejection means, and control means for providing passing of heat by way of said heat exchanger from the coolant circulated by natural convection through the core to the fluid containing circuit in the absence of pumped circulation of coolant.

2. A nuclear reactor as claimed in claim 1 wherein said pressurizer includes pressure release means.

3. A nuclear reactor as claimed in claim 2 wherein said pressurizer includes a condenser integral with the pressurizer and in communication with said pressure release means.

4. A nuclear reactor as claimed in claim 1 wherein said control means includes a duct leading from the pressurizer to the inlet of a circulator, a normally closed valved duct leading to the pressurizer from the oulet of the circulator and a normally closed duct leading from the pressurizer to a point upstream of the core.

5. A nuclear reactor as claimed in claim 4 wherein said heat exchanger is located in an upper steam section of the pressurizer so that steam condensed thereon will drop into water in the pressurizer.

6. A nuclear reactor as claimed in claim 4 wherein said heat rejection means comprises radiator means disposed in a chimney, said chimney further including a container in which said radiator means is disposed and electrically controlled means for sealing said container against through draughts.

References Cited

UNITED STATES PATENTS

| | | | |
|---|---|---|---|
| 3,150,051 | 9/1964 | Ammon | 176—53 |
| 3,245,463 | 4/1966 | Benedict et al. | 165—105 |
| 3,151,034 | 9/1964 | Douglass et al. | 176—53 |
| 3,245,879 | 4/1966 | Purdy et al. | 176—53 |
| 3,305,002 | 2/1967 | Leonard et al. | 165—105 |

BENJAMIN R. PADGETT, Primary Examiner

H. E. BEHREND, Assistant Examiner

U.S. Cl. X.R.

122—33; 165—105; 176—65